US008726009B1

(12) United States Patent
Cook et al.

(10) Patent No.: US 8,726,009 B1
(45) Date of Patent: May 13, 2014

(54) SECURE MESSAGING USING A TRUSTED THIRD PARTY

(76) Inventors: David P. Cook, Dallas, TX (US); Gary G. Liu, Plano, TX (US)

(*) Notice: Subject to any disclaimer, the term of this patent is extended or adjusted under 35 U.S.C. 154(b) by 160 days.

(21) Appl. No.: 13/012,689

(22) Filed: Jan. 24, 2011

Related U.S. Application Data

(60) Provisional application No. 61/298,470, filed on Jan. 26, 2010.

(51) Int. Cl.
*H04L 29/06* (2006.01)

(52) U.S. Cl.
USPC ............................................ 713/155; 713/168

(58) Field of Classification Search
USPC ............................................ 713/155; 726/22
See application file for complete search history.

(56) References Cited

U.S. PATENT DOCUMENTS

| 6,732,101 | B1 | 5/2004 | Cook |
| 6,760,752 | B1 | 7/2004 | Liu et al. |
| 7,136,840 | B2 * | 11/2006 | Pinkas et al. ................. 705/75 |
| 7,142,676 | B1 * | 11/2006 | Hillier et al. ................. 380/278 |
| 7,266,847 | B2 * | 9/2007 | Pauker et al. ................ 726/27 |
| 7,353,204 | B2 * | 4/2008 | Liu .............................. 705/50 |
| 7,412,059 | B1 * | 8/2008 | Pauker et al. ............... 380/277 |
| 2003/0172119 | A1 * | 9/2003 | Hosali et al. ................ 709/206 |
| 2004/0139314 | A1 | 7/2004 | Cook et al. |
| 2006/0143462 | A1 * | 6/2006 | Jacobs ........................ 713/181 |
| 2006/0190726 | A1 * | 8/2006 | Brique et al. ............... 713/168 |
| 2008/0235772 | A1 * | 9/2008 | Janzen ......................... 726/5 |

FOREIGN PATENT DOCUMENTS

WO    WO 01/30016 A2 *    4/2001    ............... H04L 9/00

* cited by examiner

*Primary Examiner* — Farid Homayounmehr
*Assistant Examiner* — Maung Lwin
(74) *Attorney, Agent, or Firm* — Fish & Richardson P.C.

(57) ABSTRACT

A system and method to send a secure message from a sender to a recipient using strong encryption protocols without the need for the recipient to create a public/private key pair and by using a third party to appropriately identify the recipient without revealing actual identification information to the third party. Upon successful identification, the third party is able to provide a recipient with information that enables recipient to create and use the actual decryption key without revealing the actual decryption key to the third party.

16 Claims, 3 Drawing Sheets

SECURE MESSAGING USING A TRUSTED THIRD PARTY

CROSS-REFERENCE TO RELATED APPLICATION

This application claims priority to U.S. Provisional Application No. 61/298,470, filed on Jan. 26, 2010. The disclosure of the prior application is considered part of and is incorporated by reference in the disclosure of this application.

FIELD OF INVENTION

The invention relates generally to computing systems and networks, more particularly to a method and system for providing secure and verifiable data transmissions between Internet users.

BACKGROUND OF INVENTION

Public key based secure messaging systems allow users to communicate securely over the Internet. Examples of public-key based secure messaging systems include S/MIME (see RFC3850-3855 of IETF) and PGP (see RFC 2440 of IETF). Although such systems have existed for many years and have been promoted by major companies, very few people use such systems today because of the complexity involved in implementing and using such systems. The problem with these systems is that both the sender and the recipient each must create and manage a pair of public and private keys, the public key must be certified by a certificate authority (CA), and the public keys must be transmitted to the other party before any encrypted message can be sent.

The same inventors of the present invention have disclosed a secure transmission system (U.S. Pat. No. 6,760,752) that significantly reduces the barrier for a user to start using public key encryption. The system hosts every user's public key in a central key server. A user only needs to generate a pair of public and private keys and answer a confirmation email before being able to send and receive encrypted messages. The recipient's public key is retrieved and certified each time when a message is sent to the recipient. However, the system still requires the recipient to have public and private keys first before a message can be sent to the recipient. Furthermore, it requires both the sender and the recipient to install a special encryption/decryption software program.

The first inventor of the present invention (David Cook) disclosed a secure forwarding system (U.S. Pat. No. 6,732,101) that allows a secure message to be sent to a recipient without requiring the recipient to have a pair of public and private keys or install special encryption/decryption software programs. The system first looks up the recipient's public key from a central key server. If the recipient's public key is found, the message will be encrypted using the recipient's public key and sent to the recipient directly. If the recipient does not have a public key in the central key server, the message will be encrypted and sent to a forwarding server where, if the recipient has specified any specific form of secure forwarding, that forwarding will be instituted. In the alternative, the recipient can be notified to pick up the message using a web browser over a secure link, such as TLS or SSL. The access of the message is controlled by a password which can be established the first time the recipient receives such a web-based delivered message. Two issues regarding this system are 1) some messages sent with the TLS web-based delivery are not picked up by the recipients, either because these recipients do not want to go through the process of establishing a password for the first time or because they have forgotten the password and are unwilling to establish a new password, and 2) senders are sometimes reluctant to use such a system because of the theoretical possibility that the message could be viewed at the forwarding server.

The inventors of the present invention also disclosed a system and method that automatically selects the best method for electronic content delivery (US Application No 2004/0139314). This system is similar to U.S. Pat. No. 6,732,101 but is extended to include other possible recipient devices, such as network gateway devices. This system has the same issues of the system of U.S. Pat. No. 6,732,101 discussed above.

There is a need for a system and method that sends secure messages to a recipient without requiring the recipient to establish a password, to generate and certify public/private keys, or to install any special encryption/decryption software.

SUMMARY OF INVENTION

The present invention was conceived with recognition that the sender of a secure message often possesses some personal information about the recipient. For example, a drugstore that needs to send prescription refill notices normally has the customer's first name, last name, address, city, state, zip code, phone number, birth date, insurance carrier, insurance policy number, doctor's name, prescription number, date of last prescription refill, etc. All or part of such information can be used for identifying the recipient for the purpose of opening secure messages.

In one aspect the present invention provides a system and method for sending a secure message from a sender to a recipient comprising: encrypting the message at the sender; sending the encrypted message to a receiver along with instructions for decrypting the message; and allowing decryption of the message at the receiver only if the recipient is satisfactorily identified by a third party.

The recipient can be identified using information already shared between the sender and the recipient. More specifically, the sender can compute a set of at least one salted hashes from the shared information and send the salted hashes to the third party. The receiving computer can obtain the shared information from the recipient, compute at least some of the salted hashes again and send them to the third party. The third party can compare the salted hashes sent from the sender at the sending time with the salted hashes sent from the recipient at the receiving time to determine whether the recipient is satisfactorily identified.

The "salt" used in salted hash computation can be a random number generated at the sender that is different for each message and sent to the receiver but never exposed to the third party.

Encrypting the message at the sender can include encrypting the message using a symmetric key and encrypting the symmetric key using a public key whose corresponding private key is controlled by the third party, and the decryption of the message can include decrypting the encrypted symmetric key at the third party, sending the decrypted symmetric key to the receiver, and decrypting the message using the symmetric key at the receiver;

Alternatively, encrypting the message at the sender can include generating a first symmetric key, creating a second symmetric key by combining the first symmetric key with a random number ("salt"), encrypting the message using the second symmetric key, and encrypting the first symmetric key using a public key whose corresponding private key is controlled by the third party, and the decryption of the message can include decrypting the encrypted symmetric key at the third party, sending the decrypted symmetric key to the receiver, and, at the receiver, recreating the second symmetric key by combining the decrypted symmetric key with the same salt and decrypting the message using the recreated second salted symmetric key.

The instructions for decrypting the message can be implemented using JavaScript or other type of code and the recipient can use a web browser or other type of program, such as an Adobe Acrobat PDF reader, to carry out the decryption of the message and to view the message.

These and other aspects of the present invention and their advantages will become apparent from the following description and from the claims.

BRIEF DESCRIPTION OF THE DRAWINGS

Like reference symbols in the various drawings indicate like elements.

DETAILED DESCRIPTION OF PREFERRED EMBODIMENT

Figure 1:
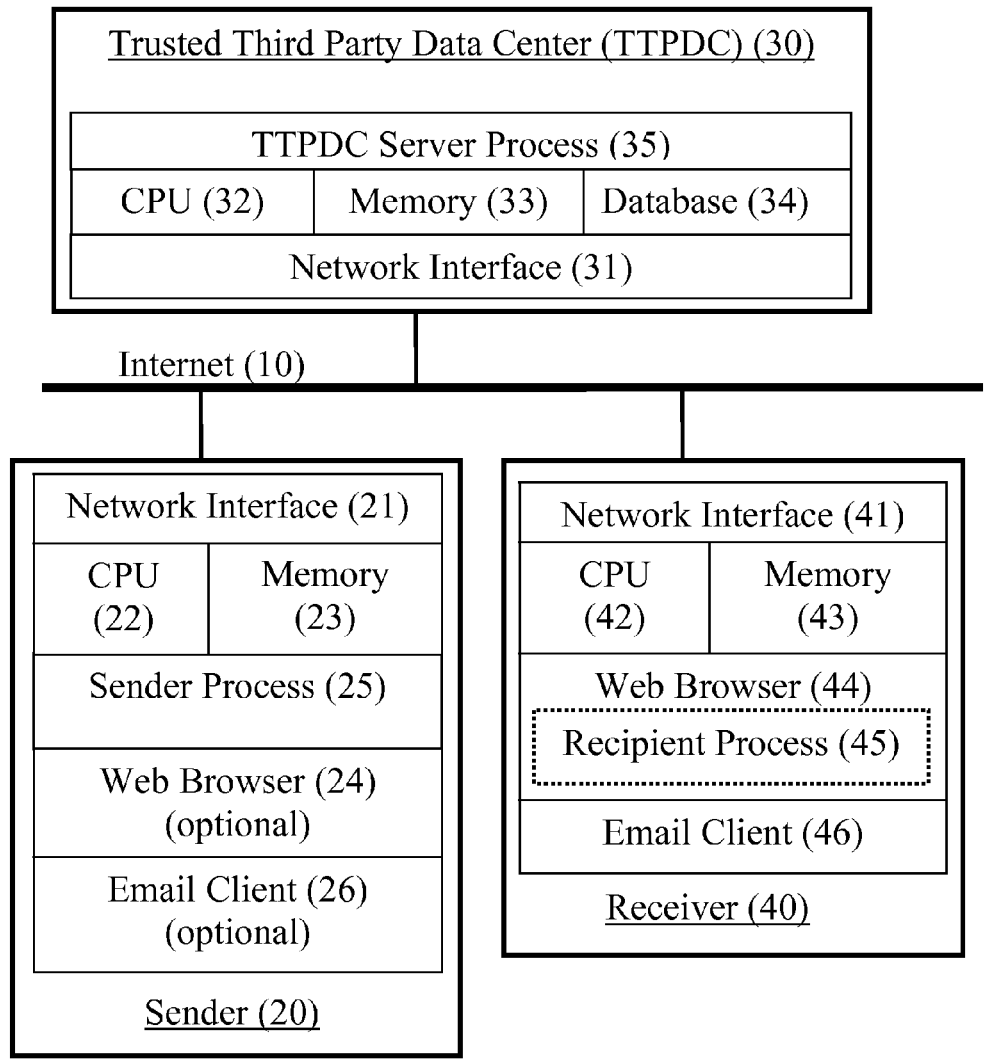
FIG. 1 shows a block diagram of a system for secure messaging using a Trusted Third Party.

A number of terms are used herein to describe network transmissions and related structures and processes.

"PrivateMessage" refers to a message requiring secure communications.

"Sender" refers to the originator of a PrivateMessage.

"Recipient" refers to the intended or authorized recipient of the PrivateMessage "Receiver" refers to the computer or other type of device used by the Recipient to receive and view the PrivateMessage.

"Network" refers to a private or public network. Private networks include an intranet, that is, a network connecting one or more private servers such as a local area network (LAN). Alternatively, the network can be a public network, such as the Internet, in which data is passed over a communication links. The network configuration can include a combination of public and private networks. For example, two or more LAN's can be coupled together with individual terminals using a public network such as the Internet.

"Internet" refers to all of the networks that use the TCP/IP suite, which cooperate to form a seamless network for their collective users. This invention has particular applicability to communications on the Internet. However, other communications over other networks can also benefit from the secure messaging features disclosed herein.

"Encryption" or "encrypted" or "encrypt" refers to a process of encoding a document or data in order to hide its content from anyone except an intended or authorized party.

"Decryption" or "decrypted" or "decrypt" refers to the reciprocal process, by a receiving party, of recovering the original data. Two encryption methods are used and described in greater detail below: symmetric key encryption and public key encryption.

"Symmetric key encryption" refers to an encryption method in which the encipher key and the decipher key are the same or can be easily derived from each other. In one implementation, AES encryption is used for symmetric key encryption. SKE(Symkey, Data) is the notation used herein to denote symmetric key encryption (i.e., the Data is encrypted by the Symkey using a symmetric key encryption algorithm, such as AES).

"Public key encryption" refers to an encryption method in which the encipher key and decipher key are different. The encipher key, referred to herein as "public key", is used to encrypt the message and the corresponding decipher key, referred to herein as "private key", is used to decrypt the message. Because it is extremely difficult to find the private key if one knows only the public key, the public key can be made public to alleviate difficulty of a symmetric key exchange between the Sender and Recipient. In a common hybrid implementation, data can be symmetrically encrypted using a random symmetric key, and then the random symmetric key can be encrypted using a public key encryption algorithm. In one implementation, RSA public key encryption algorithm is used to encrypt a randomly generated symmetric key, and then the symmetric key is used to encrypt a given message using AES encryption. PKE(PubKey, Data) is the notation used herein to denote public key encryption (i.e., the Data is encrypted by the PubKey, a public key). If the data to be encrypted is small enough, the data can be directly encrypted by the public key without using a public key/symmetric key hybrid. PKE(Keys, Data) is also used herein to indicate the result of encrypting Data using a set of public keys (instead of a single public key) and put the results together. For example, if Keys=Key1+Key2+Key3, then PKE (Keys, Data)=PKE(Key1,Data)+PKE(Key2,Data)+PKE (Key3,Data). This allows a given Data to be encrypted separately by a number of different keys.

"PKCS" or "X.509" refers to a group of cryptography standards, collectively herein "Cryptographic Standards." PKCS refers to a group of Public Key Cryptography Standards devised and published by RSA Security. X.509 is an ITU-T standard for a Public Key Infrastructure (PKI) X.509 specifies, amongst other things, standard formats for public key certificates, certificate revocation lists, attribute certificates, and a certification path validation algorithm. The Telecommunication Standardization Sector (ITU-T) coordinates standards for telecommunications on behalf of the International Telecommunication Union (ITU) and is currently based in Geneva, Switzerland.

"TLS" or "SSL" refers to Transport Layer Security or Secure Socket Layer for the end-to-end encryption of data sent over networks, such as the Internet. These are sometimes referred to as "HTTPS."

"Hash" or "hashed" or "hashing", denoted by HASH (Data), refers to a process of applying a one-way hash function to the Data. An example of one-way hash function would be the SHA-256 hash function. "Salted hash" refers to a process of combining a random number ("salt") with the data to be hashed and then apply a hash function on the combination. It is noted that the probability that the hash of two different data items being the same ("Collision") is extremely small, however not zero, and recent developments in cryptography have produced collisions for relatively weak hash functions such as MD5 and for SHA1 with reduced rounds. In order to further reduce the already small probability of a Collision, any reference to a hash function may be considered by the reader to allow for a concatenated result from two or more hash functions. For example, Hash1=HASH(Data1) can also be assumed to mean Hash1=Concatenate(HASH (Data1)+HASH(Data1+Pad1)+HASH(Data1+Pad2) . . . ), where Pad1, Pad2, etc., are random data Pads. It is noted that the concatenation using two or more different hash algorithms on the original Data1 as opposed to using the same hash algorithm with different Pads is also effective at reducing the probability of collision.

"Signature" refers to a designator that is attached to a document that can be verified to authenticate the originator and the integrity of the document.

"Signing" or "signed" or "sign" refers to a specific operation that is applied to a document, message or string to produce a verifiable form of a signature.

"Signature verification" is the reciprocal process for validating the signature produced by the signing process. SIGNED(PrivKey, Data) is the notation used herein to denote the result of a signing process (i.e., denotes the Data is signed by the PrivKey, a private key). The signature can be computed using an asymmetric key digital signature algorithm (such as DSA Digital Signature Algorithm). One way of signing Data is to first compute the hash of Data, then compute the signature from the hash using the asymmetric key algorithm, and finally append the signature to Data. In this case, SIGNED (PrivKey, Data) will include the Data itself and the signature attached. Alternatively, if the Data is small enough, the signature may be directly computed from the Data instead of the hash of the Data. In this case, SIGNED(PrivKey, Data) can contain only the signature.

Plus sign "+" is used herein to indicate that several data items are packed into one Data package. For example, SIGNED(PrivKey, Data1+Data2+Data3) indicates that Data1, Data2, Data3 are first packed into one data package and then the package is signed using the PrivKey.

Equal sign "=" is used herein to indicate that a data structure named on the left hand side is constructed according to the processes defined on the right hand side. For example:

EncSignedData=*PKE*(PubKey, SIGNED(PrivKey, Data1+Data3+Data3))

defines that the data named "EncSignedData" is obtained by first combining Data1, Data2, and Data3, then signing the combination using the private key PrivKey, and finally encrypting the signed combination using public key PubKey.

TTPCSDM stands for "Trusted Third Party Controlled Self Decrypting Message" and is used by current inventors to refer to a novel type of encrypted PrivateMessage that carries a decryption engine or a code to invoke a decryption engine to decrypt the PrivateMessage. However, the decryption process is controlled by a Trusted Third Party, and only after the Recipient is satisfactorily identified by specified criterion to the Trusted Third Party, is decryption allowed. Like reference symbols in the various drawings indicate like elements.

Referring now to FIG. 1, a system for secure messaging using a Trusted Third Party is shown. The system includes a Sender (20), a Receiver (40), and a Trusted Third Party Data Center (TTPDC) (30). Sender (20), Receiver (40), and TTPDC (30) are connected through a computer network such as Internet (10).

Sender (20) can be a general purpose or special purpose computer, generally including hardware and software components such as CPU (22), Memory (23), and Network Interface (21). In addition, it can optionally include an Email Client (26), such as Microsoft Outlook or Outlook Express, and a Web Browser (24), such as Microsoft Internet Explorer, Apple Safari, or Mozilla Firefox. Sender (20) can be a cluster of computers. A Sender Process (25) can be executed on Sender (20) for sending PrivateMessages. The Sender Process (25) will be described in detail below. The PrivateMessages to be sent can originate from Sender (20). For example, Sender (20) can be a desktop computer allowing a user to compose the PrivateMessages to be sent. The PrivateMessage can be composed using a special program that implements Sender Process (25) or using Email Client (26) (such as Microsoft Outlook or Outlook Express) that has a plug-in that implements Sender Process (25). The Sender (20) can also compose the message using Web Browser (24) to access a web page that contains a compose form and code or script for carrying out the Sender Process (25). Alternatively, Sender (20) can be a gateway computer sitting between the Internet (10) and a corporate internal network connected to a number of desktop computers. In this case, the PrivateMessages to be sent can be originated from desktop computers in the corporate internal network and be delivered through the gateway Sender (20). In such a configuration, the optional elements Email Client (26) and Web Browser (24) do not need to be included in the gateway Sender (20). The gateway Sender (20) can run a special program, including a program based upon specific policies, to process the PrivateMessage and execute the Sender Process (25).

The Receiver (40) can be a general purpose or special purpose computer for a Recipient to receive PrivateMessages sent from Sender (20). It generally includes CPU (42), Memory (43) and Network Interface (41). In addition, it can include an Email Client (46) and a Web Browser (44), such as Microsoft Internet Explorer, Apple Safari, or Mozilla Firefox. During the process of a Recipient receiving a PrivateMessage, a Recipient Process (45) will be executed inside the Web Browser (44) or other appropriate software program. Recipient Process (45) will be described in greater details below. While a web browser is described in this specification for clarity purpose, it will be clear to one skilled in the art that Web Browser (44) can be any other type of computer program, such as Adobe Acrobat, that can execute Recipient Process (45) described below. Receiver (40) can be a mobile device such as a mobile phone or PDA, or any other type of device that can access the Internet and carry out the Recipient Process (45) which will be described in details below.

The Trusted Third Party Data Center (TTPDC) (30) can be a cluster of one or more general purpose or special purpose server computers. Each computer generally includes CPU (32), memory (33), and network interface (31). In addition, TTPDC (30) can include a database (34) for storing various data, which will be described in details below. A TTPDC Server Process (35) can be executing on TTPDC (30) to carry out various tasks which will be described in more details below.

Figure 2:
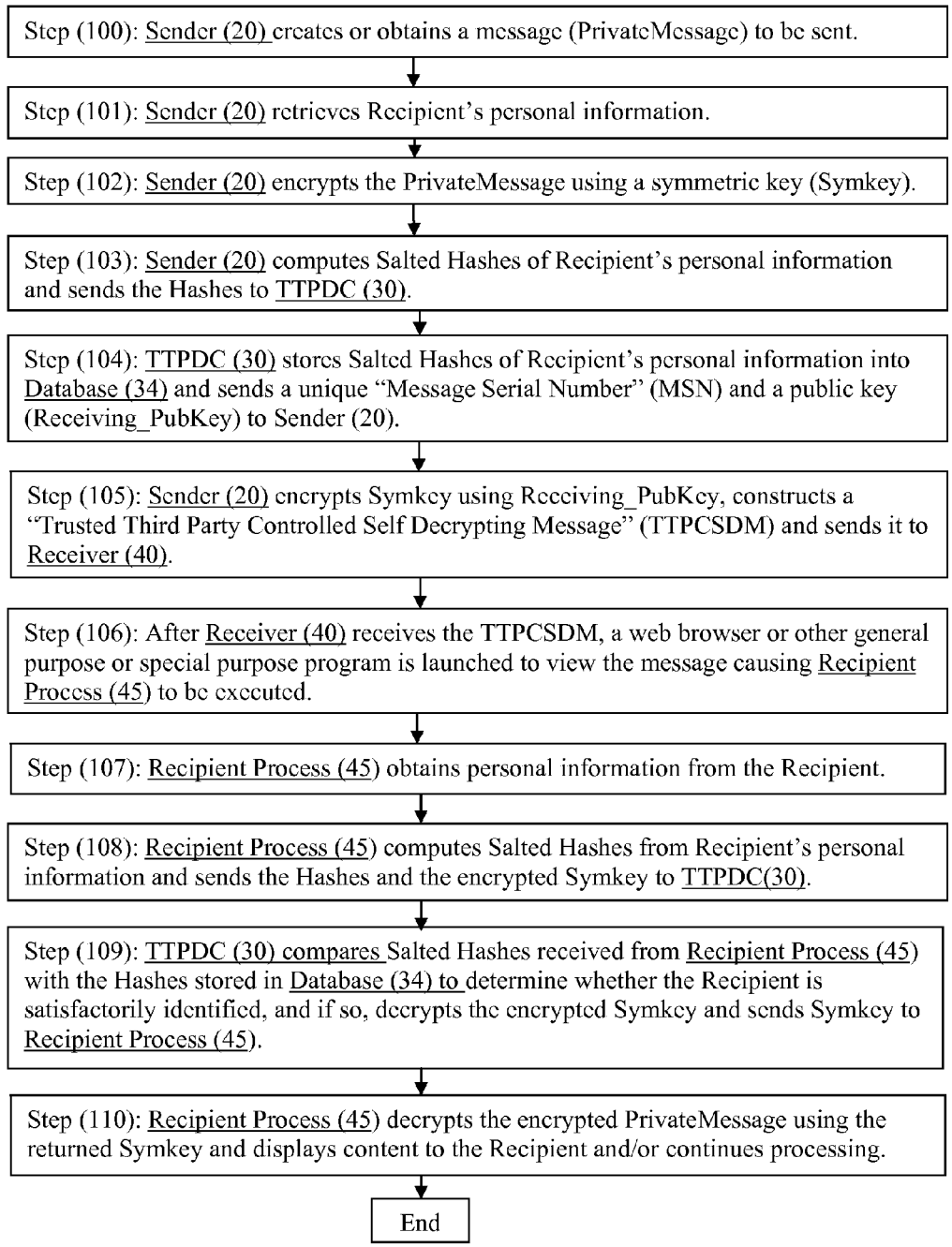
FIG. 2 shows the process of secure messaging using a Trusted Third Party.

Referring now to FIG. 2, the process of secure messaging using a Trusted Third Party is shown.

The process starts at Step (100), where Sender (20) creates or obtains a PrivateMessage to be sent securely. The PrivateMessage can be created at the Sender (20) by an individual using Email Client (26), Web Browser (24), or other specialized software. It can also be created by an automatic program (application). For example, a drugstore can use a computer program to automatically create a prescription refill notification for a customer when a prescription needs to be refilled. Alternatively, Sender (20) can be a gateway computer that sits between Internet (10) and a corporate internal network which connects a number of desktop computers. In this case, the PrivateMessage to be sent can be created at a desktop computer and is delivered through gateway Sender (20). Optionally, gateway Sender (20) can scan the message content to determine whether the message is sensitive enough, based upon policies, to require encryption or if the message has been predetermined to need encryption. If encryption is not required, gateway Sender (20) can send the message unencrypted. If encryption is required, gateway Sender (20) can encrypt the PrivateMessage according to policies that can include Sender Process (25) described below. After the PrivateMessage to be sent is created or obtained at Sender (20), the process goes to Step (101).

At Step (101), Sender (20) obtains or retrieves a set of Recipient's personal information ("Personal Information") that can be used in identifying the Recipient. In many applications, an entity that needs to send PrivateMessages to a Recipient usually possesses some Personal Information about the intended Recipient that can be used in identifying the Recipient. For example, a drugstore that needs to send prescription refill notices usually has the customer's first name, last name, address, city, state, zip code, phone number, birth date, insurance carrier, insurance policy number, doctor name, prescription number, date of last prescription refill, etc. All or part of such information can be used for identifying the Recipient. Sender (20) can identify a question or a set of questions and/or instructions that can be used to ask the Recipient to enter corresponding Personal Information. The questions or instructions should include information to instruct the Recipient to enter the information in the exact format required by the system. For example, if a piece of Personal Information is the Recipient's zip code, the corresponding question or instruction could be "What is your Zip Code (5-digit only)--?." This both asks the question and instructs the customer about the format of the answer desired. In the following descriptions, the set of Personal Information obtained at this Step will be denoted as: PI_1, PI_2 . . . PI_n, assuming there are n pieces of Personal Information obtained. The corresponding questions or instructions to ask the Recipient for each piece of Personal Information will be denoted as: Q1, Q2 . . . Qn. Q1, Q2 . . . Qn will be sent to the Receiver (40) either directly or through TTPDC (30) and will be displayed to the Recipient during the Recipient Process (45) that will be described in detail below. Additionally, Sender (20) can also specify the conditions or criterion (denoted as IDCriterion) for determining whether a Recipient is satisfactorily identified according to the Personal Information entered by the Recipient. For example, the IDCriterion may specify that the Recipient can be regarded as satisfactorily identified if the Recipient has entered at least 3 pieces of the Personal Information correctly with all other pieces left blank. However, if any information entered is incorrect, the Recipient may be rejected. More elaborate IDCriterion can be used. For example, each piece of Personal Information can be given a positive score for correct answer, a score of zero when left blank, and a negative score for an incorrect answer. Then a threshold score can be specified such that if the total score exceeds the threshold, the Recipient is regarded as satisfactorily identified. After obtaining the Recipient's Personal Information, the process goes to Step (102).

At Step (102), Sender (20) randomly generates a symmetric key (Symkey) and can use it to encrypt the PrivateMessage to be sent. In one implementation, Symkey is not used directly to encrypt the PrivateMessage, but instead is mixed with a randomly generated salt before being used for encrypting the PrivateMessage. The salt ("SaltE" for the Symkey) can be mixed with the Symkey in variety of ways. For example, a salted and hashed key can be derived according to:

SymkeySLT=HASH(SaltE+Symkey)

and then used to encrypt the PrivateMessage to obtain:

EncryptedMessage=*SKE*(SymkeySLT, PrivateMessage);

A hash (or message digest) of the EncryptedMessage can also be computed for integrity purposes according to:

MessageDigest=HASH(EncryptedMessage), and can be used in later Steps as described below. A random number, the hash of same, or another value may be substituted for HASH(EncryptedMessage). In this event, one validity check at Step (107) that allows RecipientProcess (45) to calculate the hash value of EncryptedMessage and compare to MessageDigest would not be implemented.

PrivateMessage can contain one or multiple "SuccessToken" or other data that can be used in continuing or additional processes after PrivateMessage is decrypted from EncryptedMessage by Receiver Process (45). SuccessToken, for example, can also be used to create a "message opening" receipt that is sent to Sender (20) by Recipient Process (45) as described below at Step (110). After Step (102), the process goes to Step (103).

At Step (103), Sender (20) computes salted hashes of the Recipient's Personal Information and sends the hashes to TTPDC (30). The salted hashes can be computed using the same salt:

PIhash_1=HASH(SaltPI+PI_1);

PIhash_2=HASH(SaltPI+PI_2);

. . .

PIhash_*n*=HASH(SaltPI+PI_*n*);

where,

SaltPI is a large random number (256-bit, for example) used for all hash computations.

Alternatively, the hash of each piece of Personal Information can be computed using a different salt, such as:

PIhash_1=HASH(SaltPI_1+PI_1);

PIhash_2=HASH(SaltPI_2+PI_2);

. . .

PIhash_*n*=HASH(SaltPI_*n*+PI_*n*);

where,

SaltPI_1, SaltPI_2 . . . SaltPI_n are independently generated large random numbers.

The salts used for computing salted hashes should be randomly generated and be different for each PrivateMessage. After computing salted hashes, Sender (20) sends these hashes and other information to TTPDC (30). Personal Information can be a password shared between Sender (20) and the Recipient. Sender (20) has the option of defining the question of "Please Enter Password--?" and pre-sending or pre-informing a particular Recipient of the appropriate answer (password). In this case, Sender (20) would fully control the answer (password) and the associated salt and TTPDC (30) would never know the password or the associated salt.

The data sent to TTPDC (30) can include the list of PI_1, PI_2 . . . PI_n, IDCriterion, MessageDigest, and HASH (Symkey). Certain normalization of the data may be needed before computing the hashes. For example, if a piece of the Recipient's Personal Information is an alphabetic string that is not case sensitive, the string may be converted to all lower case or all upper case before the hash is computed. Most strings need to be normalized by removing any extra white space characters (stripping leading spaces, trailing spaces, and any extra space between words, leaving only one space between words). Abbreviations, for example, in a street address, such as "St", "St." "Str.", etc., can also be normalized to "street" before applying hash function. The normalization process ensures that the Recipient can enter the same information in slightly different ways but the resulting salted hash will always be the same. The reason for adding salt in hashes is because Personal Information has a limited number of possible answers, and therefore, it is easy to establish a hash table that can be used to find the Personal Information related to a hash. For example, the maximum number of 5-digit zip codes is 99,999. Creating a hash table representing each zip code and then comparing to the hash of an "unsalted" zip code would produce a very fast match. Adding salt to the hashes will prevent TTPDC (30) from establishing a hash table and using a hash value to discover the corresponding Personal Information. For this reason, salts such as SaltPI or SaltPI_1 through SaltPI_n should not be sent to TTPDC (30). In one implementation, each PI_1, PI_2 . . . PI_n can have more than one acceptable PIhash_1, PIhash_2 . . . PIhash_n. For example, if the street name of a customer is "Big Bend Trail Circle" and the corresponding question asked is "Please enter your street name--?" then it is possible to have many answers that could be considered correct but are unable to be confined to a single hash, even after normalization of the data. Possible answers could include: "Big Bend" or "Big Bend Tr." or "Big Bend Trail" or "Big bend trail cir" or "Big bend circle." Therefore, it may be necessary to supply more than one possible hash answer to a question in order to account for these types of data.

The data sent to TTPDC (30) may be signed by Sender (20) and/or encrypted using a public key of TTPDC (30). The purpose of sending this data to TTPDC (30) is to establish a specific message serial number with appropriate data attached and to request the return of important information, such as the Recipient public key, the message serial number, etc as is more fully described in Step (104) below. In one implementation, the data sent to TTPDC (30) in this Step can be constructed according to the following set of formulas:

PI_Hash_Misc_Package=*PKE*(TTPDC_PubKey, Signed_PackageData);

where,

TTPDC_PubKey is a public key belonging to TTPDC (30), and its corresponding private key is controlled by TTPDC (30), Signed_PackageData=SIGNED(Sender_PrivKey, PI_PackageData)

where,

Sender_PrivKey is a private key controlled by Sender (20) and its corresponding public key Sender_PubKey can be stored in Database (34) of TTPDC (30) and be used for signature verification of Signed_PackageData, PI_PackageData=PIhash_1+PIhash_2+ . . . +PIhash_*n*+IDCriterion+MessageDigest+HASH (Symkey)+Control_Data;

where,

Control_Data indicates various optional data used for various purposes, all other data items have been defined in the descriptions above;

HASH(Symkey) is sent to TTPDC (30) as part of PI_Hash_Misc_Package but will not be sent to Receiver (40), thus allowing an additional independent check of the validity of data being sent to TTPDC (30) later from Receiver (40) and RecipientProcess (45).

Control_Data may be used by Sender (20) to specify how many times the PrivateMessage can be accessed, whether Sender (20) wishes to receive a PrivateMessage "opening notification" (receipt), where to send the receipt, billing or commission codes, locking or unlocking criteria, PrivateMessage expiration criteria, password establishment options and criteria, Recipient domain name (i.e., ibm.com), etc.

Control_Data, in some implementations, can include a clear text "Subject Line" of the PrivateMessage for later reference by Sender (20). Later reference, in this case, could include the viewing of all messages sent by Sender (20), the Subject Line, time of successful opening, number of failed identification attempts, and so on. The Subject Line could contain a unique message number generated by Sender (20). Control_Data can include an optional unique "Recipient Identifier" that can take various forms. Often, a unique Recipient Identifier is the email address of the Recipient. However, for example, a drug store sending prescription refills may be reluctant to allow the email addresses of customers to be available outside of its own system. In this case, a hashed email address could be included or a salted and hashed email address could be included (as long as the same salt is used each time a PrivateMessage is sent to the particular Recipient). Sender (20) may use a fixed salt that is the same for all Recipients of Sender (20) or different salt for each Recipient of Sender (20). An even simpler version is for Sender (20) to create a unique random number (or use an account number) for the Recipient Identifier. The same number would be the Recipient Identifier sent to TTPDC (30) in Control_Data and used for every PrivateMessage sent to the particular Recipient. Regardless of whether the Recipient Identifier is the actual email address, a hashed email address, a salted and hashed version of the email address, or a random number, TTPDC (30) will be able to store the combination of Sender (20) and Recipient Identifier together as a unique pair. This enables Sender (20) to optionally allow the establishment of a password or passphrase for a particular Recipient without the password being known to either Sender (20) or TTPDC (30) as described in Continuing Processing at Step (110) below. Any Recipient with a unique Recipient Identifier is also known herein as an "Identified Recipient." Importantly, when a new Recipient Identifier is stored in combination with Sender (20), a public/private key pair may be created and stored in Database (34) in accordance with Cryptographic Standards or in alternate forms as appropriate. This allows each Recipient to have a unique assigned public/private key pair.

TLS or SSL can be used between Sender (20) and TTPDC (30) to encrypt data sent, in place of, or in addition to, the Public Key Encryption described above.

After sending PI_Hash_Misc_Package to TTPDC (30), the process continues to Step (104).

At Step (104), TTPDC (30) receives PI_Hash_Misc_Package from Sender (20) and will process the data using TTPDC Server Process (35). If the Data is encrypted and signed, TTPDC Server Process (35) will decrypt the Data using TTPDC_PrivKey, and then perform a signature verification of Sender (20) using Sender_PubKey. If successful, TTPDC Server Process (35) will store data received such as PI_Hash_Misc_Package described above into the Database (34) indexed to a unique Message Serial Number ("MSN"). In addition to data items contained in PI_Hash_Misc_Package, such as Control_Data, the stored information can include data items available at TTPDC (30) or sent by Sender (20) previously, such as Sender_PubKey, date and time of the PrivateMessage, and an MSN_Status flag (indicating whether the PrivateMessage has been accessed by the Recipient, how many times the PrivateMessage has been accessed successfully, how many times the Recipient has tried to access the PrivateMessage but failed, etc.). After storing the PI_Hash_Misc_Package and other related items, TTPDC Server Process (35) can return the MSN and a public key (denoted as Receiving_PubKey) to Sender (20). Receiving_PubKey can be the same for all Recipients or each Recipient can have a different Receiving_PubKey. If each Recipient has a different Receiving_PubKey, then a Recipient Identifier needs to be sent to TTPDC (30) at Step (103) above in order to enable TTPDC Server Process (35) to find the correct Recipient public key (Recipient_PubKey). The Recipient Identifier, as described in detail at Step (103), can be one of a number of unique Identifiers, including the Recipient's email address, a unique random number or account number, a hash of the Recipient's email address, or a salted hash of the Recipient's email address. The corresponding private key (Receiving PrivKey) is controlled by the TTPDC (30) and will not be revealed to any party. In a simple implementation, Receiving_PubKey can be the same key used for encrypting PI_Hash_Misc_Package (TTPDC_PubKey). The advantage of this implementation is that TTPDC (30) needs to keep only one pair of public and private Keys. The data returned from TTPDC Server Process (35) to Sender (20) can be signed by TTPDC (30) and/or encrypted using a public key of Sender (20) as follows:

SIGNED(TTPDC_PrivKey, MSN+Receiving_PubKey)

or

PKE(Sender_PubKey, SIGNED(TTPDC_PrivKey, MSN+Receiving_PubKey))

Certain Securities and Exchange Commission ("SEC") rules, Federal Rules of Civil Procedure, and other rules and laws may require both Senders and Recipients to not only archive, but to produce email and other messages or documents in a timely fashion. Significant penalties and/or fines may be imposed upon failure to produce. Thus many corporations have adopted policies requiring the efficient and effective archival of messages sent or received by the corporation. One popular method, that combines several functions, is an "appliance" that sits between the corporate network and the Internet. Such appliances can handle tasks such as spam filtering, virus detection, and capture and archiving of incoming or outgoing messages. Other methods include capturing messages from internal network mail systems, such as Microsoft Exchange, and archiving from those systems. In the case of encrypted email that arrives at a corporation, two major problems exist, 1) the encrypted message could contain harmful contents, such as viruses, and 2) while the encrypted message can be archived, such encrypted messages, if required, cannot be produced in a readable form unless the corporation has a mechanism for opening such encrypted messages. The issue of whether an email message sent to an individual at a corporation email address belongs to the corporation or the individual is largely resolved in the favor of corporation. In the case of Internet Service Providers ("ISPs") or public email systems, such as EarthLink, MSN, AOL, Hotmail, Gmail, or Yahoo! Mail, the ownership of encrypted messages is under the control of the Recipient. Therefore, in the present invention, it is an important function that a receiving corporation, as opposed to an ISP or public email system, optionally be able to open an encrypted message, scan for viruses or other threats, and properly archive such encrypted messages. To this end, the Sender (20), along with the Receiving_PubKey, may receive one or more additional public keys ("Corp_PubKeys") from the TTPDC (30). In this case, the data returned from TTPDC (30) can be:

SIGNED(TTPDC_PrivKey, MSN+Receiving_PubKey+Corp_PubKeys)

or

PKE(Sender_PubKey, SIGNED(TTPDC_PrivKey, MSN+Receiving_PubKey+Corp_PubKeys))

Corp_PubKeys can be one key or multiples keys depending on requirement. For example, if both the Sender side and the Receiver side require Corp_PubKeys for archiving, virus checking, etc., then Corp_PubKeys=Sender_Corp_PubKey+Receiver_Corp_PubKey;

where,

Sender_Corp_PubKey is the public key that allows, by use of the associated private key that is under the control of Sender (20)'s organization, to appropriately archive, virus check, etc., on the sending side, Receiver_Corp_PubKey is the public key that allows, by use of the associated private key that is under the control of Receiver (40)'s organization, to appropriately archive, virus check, etc., on the receiving side;

TTPDC (30) may allow authorized registration of Corp_PubKeys by both Sender (20)'s organization and Receiver (40)'s organization. Sender (20) and Receiver (40) may have one or more public keys for these purposes. Each key may optionally be registered for a given domain (i.e., ibm.com) or for multiple domains (i.e., ibm.com, europe.ibm.com, asia.ibm.com, etc.).

SSL can be used between Sender (20) and TTPDC (30) to encrypt data, in place of, or in addition to, the Public Key Encryption using a public key of Sender (20). The process then goes to Step (105).

At Step (105), Sender (20) receives the MSN, Receiving_PubKey, and optionally the Corp_PubKeys from TTPDC (30) and then creates a special novel type of secure message, referred to by the current inventors as a "Trusted Third Party Controlled Self Decrypting Message" ("TTPCSDM"), to send to Receiver (40). As the name implies, the TTPCSDM is an encrypted secure message that carries a decryption engine (or a script, applet, or code to invoke a decryption engine) to decrypt the secure message. However, the decryption process is under the control of a Trusted Third Party. Only after the Recipient of the secure message is satisfactorily identified by TTPDC Server Process (35), is decryption of the secure message allowed. In one implementation, the TTPCSDM is an HTML file attached or linked to an email message sent to Receiver (40). The HTML file can include a JavaScript or a Java applet that can be run in a web browser to carry out the decryption process. The HTML file can include the following data items:

a) SIGNED(Sender_PrivKey, MSN+MessageDigest+PKE(Receiving_PubKey, MSN+Symkey)),
b) EncryptedMessage,
c) list of Q1, Q2 . . . Qn,
d) salts such as SaltE, SaltPI or the list of SaltPI_1, SaltPI_2 . . . SaltPI_n,
e) JavaScript or Java applet to carry out Recipient Process (45) in a web browser,
f) PKE(Corp_PubKeys, SymkeySLT), if Corp_PubKeys have been returned to Sender (20);

Some or all the data items a) through f) can be embedded as one or more data segments inside the JavaScript or Java applet. If Sender (20)'s organization requires the message to be archived, virus-checked, etc., PKE(Sender_Corp_PubKey, SymkeySLT) will be included in the TTPCSDM, thus enabling Sender (20) to do such. After Sender (20) sends the TTPCSDM to Receiver (40), the process goes to Step (106).

At Step (106), Receiver (40) receives the TTPCSDM and a portion of it is displayed to the Recipient. If Receiver (40)'s organization requires the message to be archived, virus-checked, etc., PKE(Receiver_Corp_PubKey, SymkeySLT) will be included in the TTPCSDM, thus enabling Sender (20) to do such. In one implementation, the TTPCSDM is received as an attachment or a link in an email message which can be shown to the Recipient within an email client such as Outlook or Outlook Express. The TTPCSDM is an HTML file that includes a JavaScript, Java applet, or other code for carrying out Recipient Process (45). When the Recipient clicks the attachment or link, the default web browser or other appropriate software (Web Browser (44)) will be launched and the JavaScript, Java applet, or other code will be executed to carry out Recipient Process (45). The process then goes to Step (107).

At Step (107), Recipient Process (45) displays Q1, Q2 ... Qn to the Recipient and the Recipient enters the corresponding Personal Information. In one implementation, Q1, Q2 ... Qn is embedded as data items in the JavaScript or Java applet that implements Recipient Process (45). In an alternative implementation, Q1, Q2 ... Qn can be retrieved from TTPDC (30) or another server computer on the Internet and Sender (20) is able to customize and update the list of Q1, Q2 ... Qn according to what Personal Information about the Recipient that Sender (20) possesses. Q1, Q2 ... Qn do not have to all be presented to the Recipient. For example, if only 3 out 8 (n=8) questions need to be answered correctly for the Recipient to be satisfactorily identified, then only three questions randomly selected from Q1, Q2 ... Qn can to be presented to the Recipient. In addition, the random selection of the questions and the order they are retrieved and presented to the Recipient can be different each time the Recipient tries to access the PrivateMessage. Furthermore, these questions can be retrieved in a distorted graphic form that is easy for a human to read but difficult for an automatic computer program to recognize. The distortion for the same question can be different each time it is retrieved and presented to the Recipient. Some consistency check and verifications to ensure the integrity of the TTPCSDM can also be conducted at this Step. For example, if MessageDigest contained in the signed Data is the HASH(EncryptedMessage), then it can be compared with a hash (message digest) recalculated from EncryptedMessage to see if they match, etc. The process then goes to Step (108).

At Step (108), Recipient Process (45) computes salted hashes from the Personal Information answers obtained from the Recipient and sends the salted hashes and encrypted Symkey to TTPDC (30). The same normalization process used by Sender (20) in Step (103), such as removing extra white space characters, converting all letters to the same case for case-insensitive entries, etc., should be applied to the data before computing the salted hashes. In one implementation, the Data sent to TTPDC (30) includes:

Decryption_Request=*PKE*(TTPDC_PubKey, Decryption_RequestData);

where,

Decryption_RequestData=Return_Symkey+PIhash_1+PIhash_2+...PIhash_*n*+Supplement_Info+SIGNED(Sender_PrivKey, MSN+MessageDigest+*PKE*(Receiving_PubKey, MSN+Symkey));

where,

Return_Symkey is a symmetric key generated by Recipient Process (45),

PIhash_1, PIhash_2 ... PIhash_n are computed in the same way as described in Step (103) using the same salts obtained from the TTPCSDM, Supplement_Info is explained below, SIGNED(Sender_PrivKey, MSN+MessageDigest+PKE (Receiving_PubKey, MSN+Symkey)) is obtained from the HTML file portion of the TTPCSDM sent by Sender (20).

Supplement_Info can contain some supplemental information about the data entered by the Recipient. For example, which of the Q1, Q2 ... Qn have been answered by the Recipient and which are left blank, how salted hashes of the answers PIhash_1, PIhash_2 ... PIhash_n are packed in the Decryption_RequestData etc. The information about which of the Q1, Q2 ... Qn have been answered and which are left blank can be useful for determining whether the Recipient is satisfactorily identified according to IDCriterion. For example, IDCriterion can specify that only 3 out of 5 questions need to be answered correctly while others are left blank; however, if any answer is incorrect, the Recipient may be rejected. In an alternative implementation, Decryption_RequestData can be directly sent to TTPDC (30) using TLS or SSL, instead of encrypting it with the TTPDC_PubKey. The advantage of this alternative implementation is that the JavaScript, Java applet, or other code that performs Recipient Process (45) does not have to implement Public Key Encryption algorithms, which can be very complex and slow. Only symmetric key encryption and hash functions need to be implemented with JavaScript or a Java applet or the like, which runs very fast. This enables the ability to read these PrivateMessages on a mobile phone or other less capable computing device. Although TLS or SSL still uses Public Key Encryption, it is run with browser's native encryption code and therefore is very fast and efficient. After sending Decryption_Request to TTPDC (30) the process then goes on to Step (109).

At Step (109), the TTPDC Server Process (35), if necessary, decrypts Decryption_Request using TTPDC_PrivKey. TTPDC Server Process (35) then determines whether the Recipient is satisfactorily identified by comparing the salted hashes received from Recipient Process (45) with the salted hashes previously stored in Database (34) for the specific MSN at Step (104). The criterion for satisfactory identification is defined in IDCriterion stored in the Database (34) and can be used in this Step. Verifications at this Step can also include signature verification on SIGNED(Sender_PrivKey, MSN+MessageDigest+PKE(Receiving_PubKey, MSN+Symkey)) using Sender_PubKey that is stored with MSN in Database (34), verification that MessageDigest contained in the signed data is the same as the MessageDigest in PI_Hash_Misc_Package stored in Database (34) at Step (104), verification that the MSN is not expired, locked, or revoked by Sender (20), etc. (using Control_Data and MSN_Status). If all verifications are successful, TTPDC Server Process (35) decrypts the PKE(Receiving_PubKey, MSN+Symkey) to recover MSN and Symkey, computes HASH(Symkey), and verifies that the hash matches HASH(Symkey) in the PI_Hash_Misc_Package previously stored in Database (34) at Step (104) and that the recovered MSN matches the current MSN. If successful, TTPDC Server Process (35) will encrypt the recovered Symkey using Return_Symkey and send SKE (Return_Symkey, Symkey) to Receiver Process (45) and processing moves to Step (110).

The purpose of verifying HASH(Symkey) is to ensure the consistency between HASH(Symkey) sent from Sender (20) to TTPDC (30) at Step (103) and PKE(Receiving_PubKey, MSN+Symkey) sent from Receiver (40) to TTPDC (30) at Step (108).

If all verifications are successful, TTPDC Server Process (35) can optionally send a PrivateMessage "opening receipt" or other notification to Sender (20) that indicates the date and time the Recipient has successfully accessed the message.

While this notification is under the control of TTPDC Server Process (35) and cannot be tampered with by the Recipient, it is possible, in the event of a Receiver (40) computer crash, corrupted data, etc., that the Recipient might not actually view the PrivateMessage. In an alternative implementation, the "opening receipt" process can be carried out as part of the "Continued Processing" described at Step (110) below.

If any verification fails, TTPDC Server Process (35) will record one failed opening attempt for the specific MSN and notify RecipientProcess (45). If the number of failed attempts exceeds a certain level, for example 3, TTPDC Server Process (35) may lock the specific MSN, thus preventing further access and also notify Sender (20) that the delivery has failed and the reasons for the failure. Notification to Sender (20) can include various supplemental data such as IP addresses, dates, times, etc. Processing then moves to Step (110).

At Step (110), after receiving SKE(Return_Symkey, Symkey) returned from TTPDC (30), Recipient Process (45) then uses Return_Symkey to decrypt SKE(Return_Symkey, Symkey) and recover Symkey. Recipient Process (45) then recreates SymkeySLT using Symkey and SaltE and uses SymkeySLT to decrypt EncryptedMessage created at Step (102) and recover the PrivateMessage for display and/or further processing. Optionally recovered is SuccessToken or other data included at Step (102). In some implementations, the Recipient Process (45) does not end after the PrivateMessage is decrypted. Recipient Process (45) can continue with additional processes ("Continued Processing").

Continued Processing, for example, could include Recipient Process (45) accessing a prescription refill site, by use of the recovered SuccessToken, where the Recipient is given information and choices regarding the prescription refill.

Continued Processing could also send an "opening receipt" to Sender (20), including SuccessToken, as proof of successful PrivateMessage opening. An advantage of sending the receipt this way is that it ensures that the Recipient has successfully opened the PrivateMessage. In some implementations, Continued Processing is optionally allowed by Sender (20) for the establishment of a password or passphrase ("Password") for the specific Recipient, thus enabling the Recipient to access future PrivateMessages from Sender (20) by using the Password. Continued Processing and SuccessToken could also be used for encrypted file download(s) from the Internet. For example, a SuccessToken could be a URL: "https://www.ttpdc.com/download.php?file=goodfile.exe&key=7341043349034574593". When the Recipient clicks the link, a file can be downloaded from the website, decrypted on the fly using the specified key or in some implementations by use of SymkeySLT. This type of download has the added advantage that the Recipient can be warned about possible threats posed by certain types of files, for example ".exe" files on Microsoft Windows operating systems.

Figure 3:
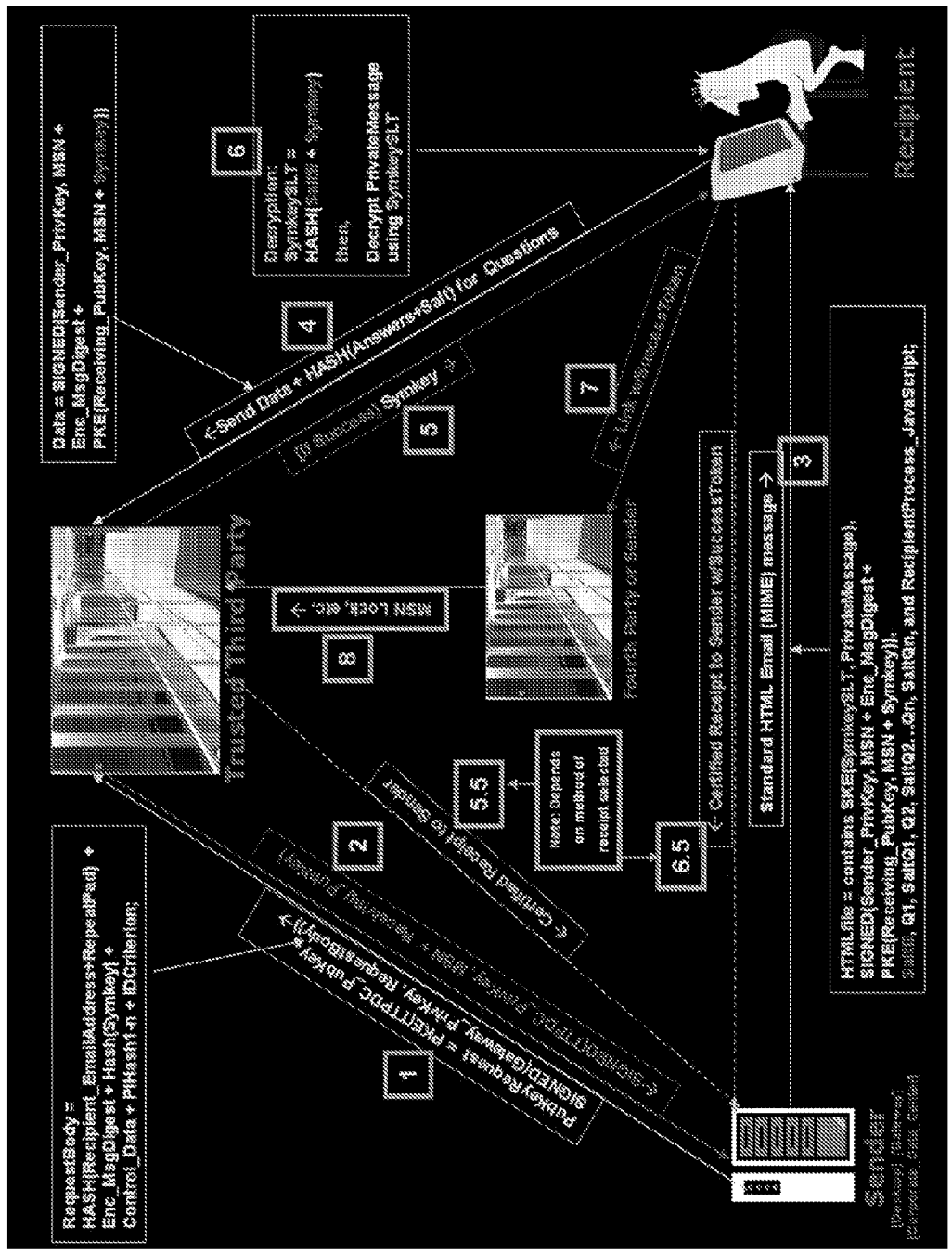
FIG. 3 shows a flow for secure message transmission.

Referring now to FIG. 3, an example process flow for sending secure messages between a sender and a recipient is shown. The process flow includes numerous steps and provides specific examples of the types of information that is passed among the sender, recipient and third party. The steps performed may be performed in other orders that that shown. Other flows are possible.

While this invention has been described in terms of several preferred and alternative implementations, it is contemplated that alterations, modifications and permutations will become apparent to those skilled in the art upon a reading of the specification and studying the drawings. For example, while the processes described herein have been primarily related to Senders (20) and their customers (Recipients), the invention can allow individual email addresses to establish and store a public/private key pair at TTPDC (30) in Database (34) and to create a Password (or Passphrase) for controlling access to the private key associated with said email address, thus allowing the Recipient to open any future TTPCSDM from any Sender (20) by entering the Password associated with the email address.

In another example, while TTPCSDM has been described as an HTML file to be viewed in a browser, it can also be a PDF file to be viewed in an Adobe Acrobat Reader or other type of file that can be viewed in other software programs, as long as Receiver Process (45) can be specified and executed in the software. Additionally, while a variety of data protection schemes such as encryption, digital signing, and hashing are described to make the process very robust, many such protections may not be necessary and can be omitted in applications where lower security levels are acceptable.

While the above described the process of sending and receiving one PrivateMessage, it is also clear to one skilled in the art that some of the processing steps can be performed for a batch of a large number of messages. For example, if Sender (20) needs to send ten thousand PrivateMessages to ten thousand different Recipients, then at Step (103), instead of sending signed and encrypted PI_PackageData to TTPDC (30) and obtain MSN and Receiving_PubKey one by one, all the PI_PackageData for all these messages can be batched together to be signed, encrypted if needed, and sent to TTPDC (30) as one request. TTPDC (30) can then return a large number of responses as a batch to Sender (20). In this way, the CPU intensive computations such as digitally signing/verification, public key encryption/decryption, and Internet communications can be greatly reduced.

Furthermore, certain terminology has been used above for the purposes of descriptive clarity, and should not be construed to limit the above described methods or techniques. It is therefore intended that the following appended claims include all such alterations, modifications and permutations as fall within the true spirit and scope of the description presented herein.

What is claimed is:

1. A method for sending a secure encrypted message from a sender to a recipient over a network comprising:
   at a sender,
      creating a message to be sent to a recipient;
      creating a set of at least one question involving known or shared information for identification of the recipient;
      creating random salt for use with the recipient identification questions;
      creating a set of salted hashes corresponding to correct answers for each of the questions;
      creating a first symmetric encryption key;
      creating a random symmetric key salt;
      creating a salted version of the created first symmetric key using the random symmetric key salt;
      encrypting the message using the salted version of the first symmetric key;
      computing, using a computer, a message digest of the encrypted message;
      requesting a message serial number and a public key for the recipient from a third party by use of a secure data package including a recipient identifier, the message digest of the encrypted message, a hash of the first symmetric key, control data, the salted hashes corresponding to correct answers for the created questions, and identification criteria;

at the third party, receiving the secure data package from the sender;

generating a new message serial number;

storing the new message serial number, the recipient identifier, the message digest of the encrypted message, the hash of the first symmetric key, the control data, the salted hashes corresponding to correct answers for the recipient identification questions, and the identification criteria for later use;

accessing or creating a public/private key pair for the recipient identifier;

returning to the sender a response that includes the new message serial number and the public key for the recipient identifier, wherein the response is digitally-signed by the third party;

at the sender, receiving from the third party the response that includes the message serial number and the public key for the recipient;

confirming the correctness of the digital signature for the third party response;

creating an encrypted first data package, using the received public key for the recipient, that contains the received message serial number and the first symmetric key;

creating a second data package, digitally-signed by sender's private key, that contains the message serial number, the message digest of the encrypted message, and the encrypted first data package;

sending to the recipient, a recipient data package containing the encrypted message, the second data package, the random symmetric key salt, the set of recipient identification questions, and the random salt for use with the recipient identification questions along with embedded instructions and processes allowing for a successful identification of the recipient by the third party and for decryption of the encrypted message by the recipient after the successful identification by the third party of the recipient;

at the recipient, receiving the recipient data package from the sender;

providing an answer by recipient to each of the recipient identification questions in accordance with the embedded instructions and processes;

using the random salt associated with the questions to produce a hashed salted answer for each of the questions;

uploading securely to the third party, the second data package and the produced hashed salted answers for the questions;

at the third party, receiving securely from the recipient the second data package;

confirming the validity of the digital signature by the sender for the second data package;

retrieving the stored information for the message serial number including the recipient identifier, the message digest of the encrypted message, the hash of the first symmetric key, the control data, and the identification criteria;

retrieving the private key for the recipient;

decrypting part of the second data package using the recipient's private key in order to retrieve the message serial number and the first symmetric key;

computing the hash of the decrypted first symmetric key and comparing it to the stored hash of the first symmetric key received from the sender;

determining a success or a failure condition based upon the identification criteria and upon the control data restraints;

creating a response to the recipient that, based upon a success condition, would include the first symmetric key for use by the recipient in creating a decryption key or, based upon a failure condition, would include instructions on additional permitted attempts or alternatives to create a success condition, or would include access denial information to the recipient based upon the control data and the identification criteria;

sending the created response to the recipient;

at the recipient, receiving the response from the third party;

determining the success or the failure condition from the received response;

recreating, if the success condition is determined, the salted version of first symmetric key used in the original encryption of the encrypted message by combining the first symmetric key received from the third party with the random key salt received from the sender and then use the recreated salted version of the first symmetric key to decrypt the encrypted message; and following alternate instructions included in the response when the failure condition is determined.

2. The method of claim 1 wherein additional versions of the first symmetric key, encrypted by a public key belonging to an owner of a domain name to which the encrypted message is being sent or by a public key belonging to an owner of a domain from which the message is being sent, is included as part of the second data package sent to the recipient.

3. The method of claim 1 wherein upon the third party having successfully performed all appropriate identification and integrity tests on the uploaded data received from the recipient and the third party provides the first symmetric key to the recipient, the third party sends a notice to the sender that the message has been opened by the recipient and further stores the notice with the other stored data associated with the message serial number.

4. The method of claim 1 wherein the message is viewed by the recipient using a web browser and the instructions for decrypting the message are implemented as code running in the web browser including at least one of a script, an applet, a plug-in, or other code method supported by the browser.

5. The method of claim 1 wherein the message is viewed by the recipient using a PDF reader and the instructions for decrypting the message are implemented as code running in the PDF reader including at least one of a script, an applet, a plug-in, or other code method supported by the PDF reader.

6. The method of claim 1 wherein the message is viewed by the recipient using a mobile device enabled with code or applications capable of decrypting and displaying the secure message supported by the mobile device.

7. The method of claim 1 wherein when a failure condition is determined by the third party, additional information regarding the failure including too many attempts to open, the message serial number has expired, been locked, or revoked, the time window for opening has expired, a failure to identify recipient has occurred, or non-matching of critical data such as message serial number, is provided to the recipient.

8. The method of claim 1 wherein when a failure condition is determined by the third party, additional information regarding the failure including too many attempts to open, the message serial number has expired, been locked, or revoked, the time window for opening has expired, a failure to identify recipient has occurred, or non-matching of critical data such as message serial number, is provided to the sender.

9. A method for sending a secure encrypted message from a sender to a recipient over a network comprising:

at a sender,
creating a message to be sent to a recipient;
creating a first symmetric encryption key;
creating a random symmetric key salt;
creating a salted version of the created first symmetric key using the random symmetric key salt;
encrypting the message using the salted version of the first symmetric key;
computing, using a computer, a message digest of the encrypted message;
requesting a message serial number and a public key for the recipient from a third party by use of a secure data package including a recipient identifier, the message digest of the encrypted message, a hash of the first symmetric key, control data, and identification criteria;

at the third party,
receiving the secure data package from the sender;
generating a new message serial number;
storing the new message serial number, the recipient identifier, the message digest of the encrypted message, the hash of the first symmetric key, the control data, and the identification criteria for later use;
accessing or creating a public/private key pair for the recipient identifier;
returning to the sender a response that includes the new message serial number and the public key for the recipient identifier, wherein the response is digitally-signed by the third party;

at the sender,
receiving from the third party the response that includes the message serial number and the public key for the recipient;
confirming the correctness of the digital signature for the third party response;
creating an encrypted first data package, using the received public key for the recipient, that contains the received message serial number and the first symmetric key;
creating a second data package, digitally-signed by sender's private key, that contains the message serial number, the message digest of the encrypted message, and the encrypted first data package;
sending to the recipient, a recipient data package containing the encrypted message, the second data package, and the random symmetric key salt along with embedded instructions allowing for decryption of the encrypted message by the recipient after the successful identification by the third party of the recipient;

at the recipient,
receiving the recipient data package from the sender;
uploading the second data package securely to the third party;

at the third party,
receiving securely from the recipient the second data package;
confirming the validity of the digital signature by the sender for the second data package;
retrieving the stored information for the message serial number including the recipient identifier, the message digest of the encrypted message, the hash of the first symmetric key, the control data, and the identification criteria;

retrieving the private key for the recipient;
decrypting part of the second data package using the recipient's private key in order to retrieve the message serial number and the first symmetric key;
computing the hash of the decrypted first symmetric key and comparing to the stored hash of the first symmetric key received from the sender;
determining a success or a failure condition based upon the identification criteria and upon the control data restraints;
creating a response to the recipient that, based upon a success condition, would include the first symmetric key for use by the recipient in creating a decryption key or, based upon a failure condition, would include instructions on additional permitted attempts or alternatives to create a success condition, or would include access denial information to the recipient based upon the control data and the identification criteria;
sending the created response to the recipient;

at the recipient,
receiving the response from the third party;
determining the success or the failure condition from the received response;
recreating, when the success condition is determined, the salted version of first symmetric key used in the original encryption of the encrypted message by combining the first symmetric key received from the third party with the random key salt received from the sender and then use the recreated salted version of the first symmetric key to decrypt the encrypted message; and
following alternate instructions included in the response when the failure condition is determined.

10. The method of claim 9 wherein additional versions of the first symmetric key, encrypted by a public key belonging to an owner of a domain name to which the encrypted message is being sent or by a public key belonging to an owner of a domain from which the message is being sent, is included as part of the second data package sent to the recipient.

11. The method of claim 9 wherein upon the third party having successfully performed all appropriate identification and integrity tests on the uploaded data received from the recipient and the third party provides the first symmetric key to the recipient, the third party sends a notice to the sender that the message has been opened by the recipient and further stores the notice with the other stored data associated with the message serial number.

12. The method of claim 9 wherein the message is viewed by the recipient using a web browser and the instructions for decrypting the message are implemented as code running in the web browser including at least one of a script, an applet, a plug-in, or other code method supported by the browser.

13. The method of claim 9 wherein the message is viewed by the recipient using a PDF reader and the instructions for decrypting the message are implemented as code running in the PDF reader including at least one of a script, an applet, a plug-in, or other code method supported by the PDF reader.

14. The method of claim 9 wherein the message is viewed by the recipient using a mobile device enabled with code or applications capable of decrypting and displaying the secure message supported by the mobile device.

15. The method of claim 9 wherein when a failure condition is determined by the third party, additional information regarding the failure including too many attempts to open, the message serial number has expired, been locked, or revoked, the time window for opening has expired, a failure to identify recipient has occurred, or non-matching of critical data such as message serial number, is provided to the recipient.

16. The method of claim 9 wherein when a failure condition is determined by the third party, additional information regarding the failure including too many attempts to open, the message serial number has expired, been locked, or revoked, the time window for opening has expired, a failure to identify recipient has occurred, or non-matching of critical data such as message serial number, is provided to the sender.

* * * * *

UNITED STATES PATENT AND TRADEMARK OFFICE
CERTIFICATE OF CORRECTION

| | | |
|---|---|---|
| PATENT NO. | : 8,726,009 B1 | Page 1 of 1 |
| APPLICATION NO. | : 13/012689 | |
| DATED | : May 13, 2014 | |
| INVENTOR(S) | : Cook et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

Signed and Sealed this
Twenty-eighth Day of July, 2015

Michelle K. Lee
*Director of the United States Patent and Trademark Office*